US012718515B1

(12) United States Patent
Mirzaalian Dastjerdi et al.

(10) Patent No.: US 12,718,515 B1
(45) Date of Patent: Aug. 25, 2026

(54) KEY POINT GENERATION

(71) Applicant: Amazon Technologies, Inc., Seattle, WA (US)

(72) Inventors: Hengameh Mirzaalian Dastjerdi, Culver City, CA (US); Ali Abdool, Los Angeles, CA (US); James Shagan Overman, Los Angeles, CA (US); Bhavik M Vyas, San Rafael, CA (US)

(73) Assignee: Amazon Technologies, Inc., Seattle, WA (US)

( * ) Notice: Subject to any disclaimer, the term of this patent is extended or adjusted under 35 U.S.C. 154(b) by 383 days.

(21) Appl. No.: 18/214,997

(22) Filed: Jun. 27, 2023

(51) Int. Cl.
*G06V 10/46* (2022.01)
*G06V 10/75* (2022.01)

(52) U.S. Cl.
CPC .......... *G06V 10/462* (2022.01); *G06V 10/751* (2022.01)

(58) Field of Classification Search
CPC .......................... G06V 10/462; G06V 10/751
See application file for complete search history.

(56) References Cited

U.S. PATENT DOCUMENTS 10,445,930 B1 * 10/2019 Saylor ...................... G06T 7/80
11,461,635 B2 * 10/2022 Huang .................. G06N 3/084
11,461,924 B1 * 10/2022 Nayar ................. G06V 10/454
2019/0108445 A1 * 4/2019 Huang .................. G06N 3/084
2020/0151570 A1 * 5/2020 Ravi ...................... G06N 3/048
2020/0288050 A1 * 9/2020 Knoll .................. G11B 27/031
2021/0394710 A1 * 12/2021 Hu ........................ B60W 50/14
2023/0060380 A1 * 3/2023 Singh ................... G06F 16/215
2023/0137904 A1 * 5/2023 Najafi .................. A61B 5/1113
345/419
2024/0161316 A1 * 5/2024 Tao ........................ G06T 7/292
2024/0420296 A1 * 12/2024 Zhang ................. G06V 10/764

FOREIGN PATENT DOCUMENTS

WO WO-2021163103 A1 * 8/2021 .............. G06T 7/70

OTHER PUBLICATIONS

Jianboa Ding ("Extraction of Human Body Skeleton based on Silhouette Images") (Year: 2010).*

* cited by examiner

*Primary Examiner* — Solomon G Bezuayehu
(74) *Attorney, Agent, or Firm* — Kilpatrick Townsend & Stockton LLP

(57) ABSTRACT

A system for generating accurate training data for a machine model, and a system for training and using the machine model are disclosed. The training data is generated by taking video of a subject with two cameras, for example, an infrared (IR) camera and a visible light camera. Prior to taking the video, the subject is marked with an IR marker at key points. The key point marks are shown in the IR video and are not shown in the visible light video. The IR video is processed to generate an IR mark video emphasizing the IR marks. To train the ML model, the visible video is used as the input and the IR mark video is used as target information. Once trained, the machine learning model can generate key point marks based on video of subjects which are not marked.

20 Claims, 7 Drawing Sheets

KEY POINT GENERATION

BACKGROUND

Key point image representations may be used, for example, for facial recognition, expression recognition, gait analysis, and numerous other applications. Each key point image representation includes a number of key points, where the key points correspond with features of the subject of the image. For example, key points of a face may represent features including mouth corners, eye corners, eyebrows, cheekbones, etc. Accordingly, the key point image representation of a subject identifies relative positioning of the various features of the imaged subject.

BRIEF DESCRIPTION OF THE DRAWINGS

Various embodiments in accordance with the present disclosure will be described with reference to the drawings, in which.

DETAILED DESCRIPTION

Figure 1:
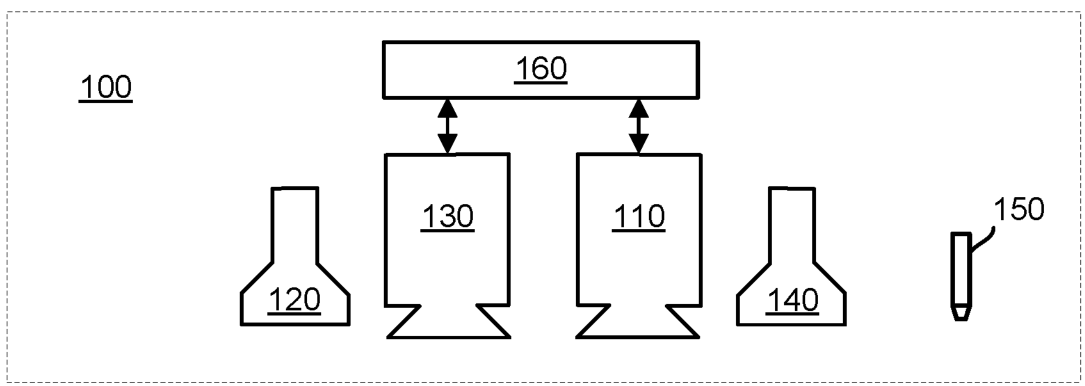
FIG. 1 is a schematic illustration of a data collection system used to collect data according to some embodiments.
Figure 1:
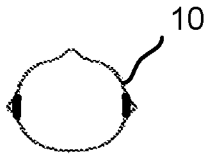

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generating key point data for subject is generally a slow, inaccurate, and resource intensive exercise. For example, a computer operator may, using a mouse, mark numerous key points on each of a series of images, for example, of a video.

This application discusses fast, accurate, and low effort methods of generating key point data which may be used to train a machine learning model. Once trained, the machine learning system generates key point data based on video input.

Techniques described herein include various aspects of methods for collecting key point data, and various aspects of methods for using the collected key point data to train and machine learning model, such that the machine learning model may be used to generate key point data based on images received as input.

The embodiments disclose technology that combines invisible ink, a set of cameras including, for example, red, green, blue (RGB) or visible and infra-red cameras, an infrared (IR) lamp, to generate a key point data set. A machine learning (ML) model is then trained using the key point data set, such that, once trained, the machine learning model accurately generates key points from input images. For example, the machine learning model may accurately mark lip contour key points on human mouths. The technology is designed to overcome challenges of manual annotation of key points which is a lengthy, costly, error prone and not scalable process.

The disclosed techniques (methods, systems, and computer-readable medium) use a set of cameras, for example, including RGB or visible and infra-red, to capture key points marked with invisible IR ink. While the RGB or visible camera does not see the markings, the infra-red camera captures the marked points on the human mouth. With this system, a dataset of a number of people with diverse skin tones is collected and used to train the machine learning model that correlates lip movement with key points marked by the invisible ink. A purpose-built ML model may be trained using the collected data, which enables precise marking of lip key points on RGB or visible video. By employing this technology, annotated lip key points can be created, for example, for video that can be utilized for other ML purposes. For example, the inferred/output data of the model may be used to train other ML models that generate videos, for example, where lip movement is synchronized with audio, for example, in automatic dubbing systems. In The current method for annotating ground truth data involves human annotation of lip contour key points on a frame-by-frame basis, which is a lengthy, expensive, error-prone, and inconsistent process. Although some ML techniques can expedite the process, human intervention is still necessary due to temporal inconsistencies caused by manual frame-by-frame annotation.

The embodiments discussed herein disclose a process that allows direct automatic annotation of videos. The technology uses machine learning (ML) for annotating, for example, lip contours in, for example, videos. The model learns directly from the videos, rather than at the frame level. To train the model, a video input consisting of solely key points is used, where the key point video is generated based on the multi-camera system.

Applications for the key points generated by the ML system include, but are not limited to, face detection, automatic dubbing, and other use cases where automatic annotation of facial key points can be beneficial. For example, automatic annotation of facial key points can be used in human-computer interaction, where facial expression analysis plays a crucial role in recognizing human emotions, intention, and attention. In addition, the technology can be used in security systems, where facial recognition is used to identify individuals in real-time. Moreover, in the entertainment industry, automatic annotation of facial key points can be used to enhance special effects and animation by providing accurate facial expression data. Overall, the technology offers an efficient and effective way to annotate facial key points for a variety of use cases using ML techniques.

The data collection system may be used by marking facial key points on a subject with an invisible IR ink pen. In addition, the subject, while speaking, is then recorded using the multi-camera system. To ensure a diverse dataset, we prefer to have a wide range of subjects with varying skin tones. In some embodiments, for the IR camera to sense the IR marks, an IR light source is also used. In some embodiments, a bandwidth of the IR marks, a bandwidth of the IR light source, and a bandwidth of the IR camera overlap at least partially.

The video generated by the IR camera is processed to generate a key point video showing the IR mark positions. The key point video may be generated, for example, by filtering out some or all other video information of the video generated by the IR camera. In some embodiments, the resulting key point video has a black background and has key points represented in white.

The ML model is trained using the RGB or visible video and the key point video. Because the RGB or visible camera does not sense the IR marks, the RGB or visible video information includes the subjects without key point markings. While been trained, the ML model generates key point locations on the subjects, and the key point video is used to provide corrective feedback.

Once the ML model is trained, the ML model may be used to generate key point data for input video images. In some embodiments, the output of the ML model is a video corresponding with the input video images, where the input video images are modified such that key point locations are indicated in the output video. In some embodiments, the output of the amount model is a video indicating the key point locations and not including the input video images.

FIG. 1 is a schematic illustration of a data collection system 100 used to collect data according to some embodiments. Data collection system 100 includes RGB or visible camera 110, RGB or visible light source 140, IR camera 130, IR light source 120, IR marker 150, and processor 160.

IR marker 150 includes IR ink, which is, for example water or alcohol-based, in which either absorbs or reflects IR light in an IR marker bandwidth. Prior to data collection system 100 being used to collect video data, the subject 10 is marked using IR marker 150 to place IR marks on the face of subject 10 at numerous locations of physical features corresponding with predefined key points or of qualitatively defined features corresponding with descriptions of key point locations. The IR marks are sensed by the IR camera 130 and are not sensed by the RGB or visible camera 110.

IR light source 120 may be any IR light source capable of emitting IR light, for example in an IR light source bandwidth. In some embodiments, the IR light source bandwidth has a peak power at a frequency which is the same or is substantially the same as the frequency of the peak power of the IR marker bandwidth. In some embodiments, the IR light source bandwidth overlaps the IR marker bandwidth such that the ink of the IR marker either absorbs or reflects IR light emitted by the IR light source 120.

IR camera 130 may be any video camera capable of generating video frame data based on IR light in, for example, an IR camera bandwidth. In some embodiments, the IR camera bandwidth is a peak power at a frequency which is the same or is substantially the same as the frequency of the peak power of the IR marker bandwidth and is the same or is substantially the same as the frequency of the peak power of the IR light source bandwidth. In some embodiments, the IR camera bandwidth overlaps the IR marker bandwidth and overlaps the IR light source bandwidth such that the ink of the IR marker either absorbs or reflects IR light emitted by the IR light source 120 and IR camera 130.

RGB or visible light source 140 may be any light source capable of emitting visible spectrum light. In some embodiments, RGB or visible light source 140 is also the IR light source 120.

RGB or visible camera 110 may be any video camera capable of generating video frame data based on visible spectrum light.

When data collection system 100 is used to collect data, IR camera 130 records IR video data of the subject 10, which has key points marked with IR marker 150, and which is illuminated by IR light source 120 and by RGB or visible light source 140. The IR video data recorded by IR camera 130 includes data representing subject 10 as well as data representing the IR marks placed at key points using IR marker 150. IR camera 130 transmits the recorded IR video data to processor 160. In addition, RGB or visible camera 110 may, for example, record RGB or visible video data of the subject 10 at the same time that the IR camera 130 records the IR video data of the subject 10. For example, the RGB or visible camera 110 and the IR camera 130 may be recording during overlapping recording time periods. RGB or visible camera 110 transmits the recorded RGB or visible video data to processor 160.

In some embodiments, processor 160 synchronizes IR camera 130 and RGB or visible camera 110 such that frames of video data are recorded at substantially simultaneous times. In some embodiments, IR camera 130 and RGB or visible camera 110 are synchronized and coordinated, for example by processor 160, such that video frame data is generated with corresponding identification marks such that one or more individual IR video data frames may be respectively identified as having been captured simultaneously with a corresponding one or more individual RGB or visible video data frames.

Accordingly, in some embodiments, data collection system 100 generates RGB or visible video data and generates simultaneously captured IR video data, where the simultaneously captured IR video data includes data representing the locations of the key points marked with the IR marker 150, and the RGB or visible video data includes data representing the subject 10 and does not include data representing the key points as marked with the IR marker 150.

Processor 160 is configured to receive the IR video data and the RGB or visible video data, and to process the received IR video data to generate IR mark video data. To generate the IR mark video data, processor 160 filters out data from the IR video data corresponding to features other than the IR marks. For example, in some embodiments, processor 160 filters out video data having a brightness less than a threshold if the IR ink of the IR marker is reflective of the IR light. As a consequence, the brightest pixels, those corresponding with the locations on the subject of the IR marks, are distinguishable over the pixels not corresponding with the locations of the IR marks. In some embodiments, processor 160 filters out video data having a brightness greater than a threshold if the IR ink of the IR marker absorbs the IR light. As a consequence, the darkest pixels, those corresponding with the locations on the subject of the IR marks, are distinguishable over the pixels not corresponding with the locations of the IR marks. The IR marks may be represented in the IR mark video data as white pixels and other pixels may be black in the IR mark video data, or vice versa.

Figure 2:
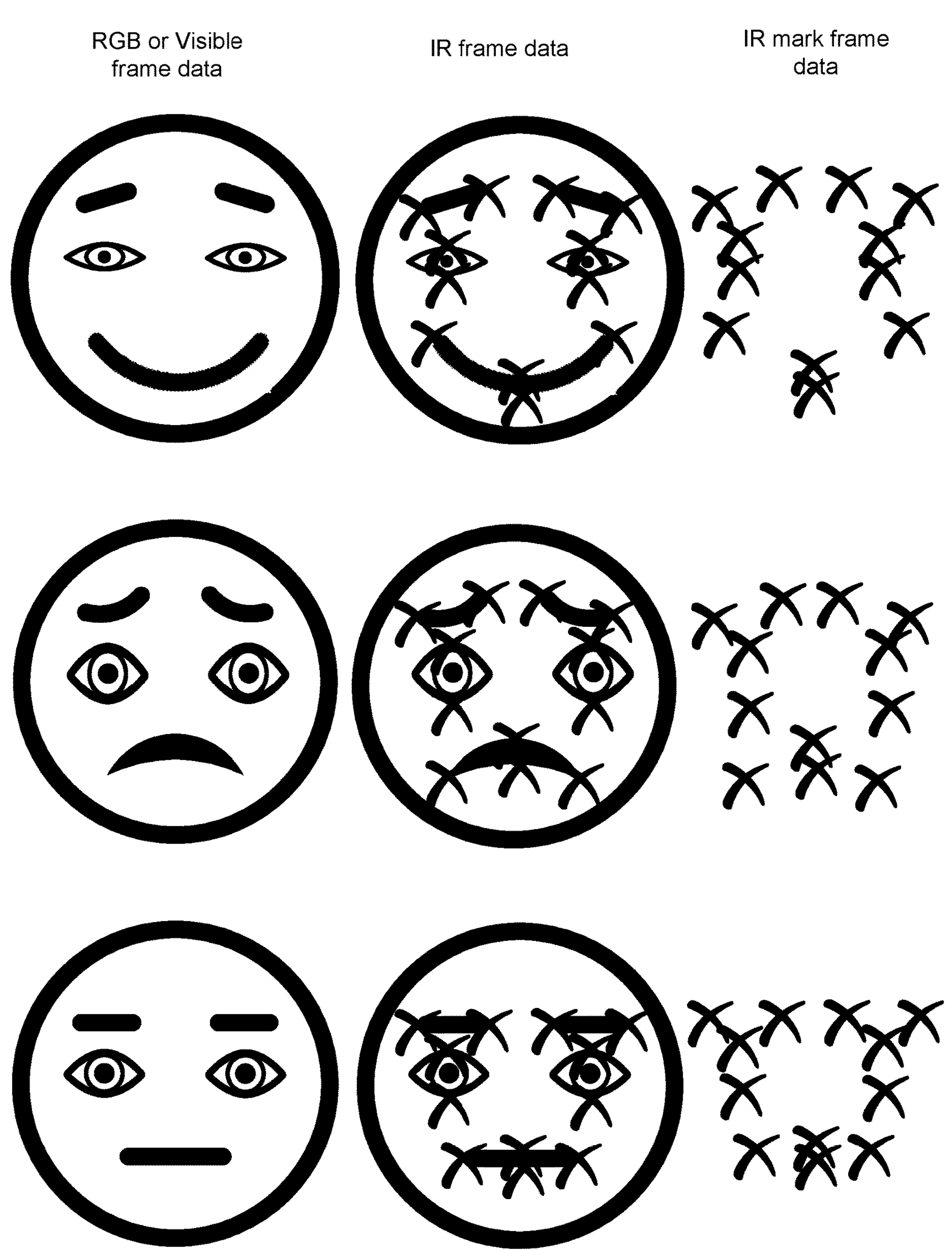
FIG. 2 is a schematic illustration of data collected and generated by the data collection system of FIG. 1 according to some embodiments.

FIG. 2 is a schematic illustration of data collected and generated by the data collection system of FIG. 1 according to some embodiments.

The illustrated RGB or visible frame data includes captured frames of the subject 10 having different expressions. Despite the subject 10 having been marked with the IR ink, the RGB or visible frame data does not include representations of the marks because the IR ink is not visible to the RGB or visible camera 110.

The IR frame data also includes captured frames of the subject having different expressions. However, because the IR camera 130 is sensitive both to the subject 10 and to the IR ink, both the subject 10 and the IR marks are represented in the IR frame data.

As discussed above, the processor 160 generates IR marked frame data based on the IR frame data. As illustrated, the IR mark frame data includes representations of the IR marks and does not include representations of the subject 10. Because the IR mark frame data is generated based on automatically captured IR frame data, the key point locations represented by the IR mark frame data is more accurate that key point location data generated by a manual process, such as frame-by-frame annotation by a computer operator.

Figure 3:
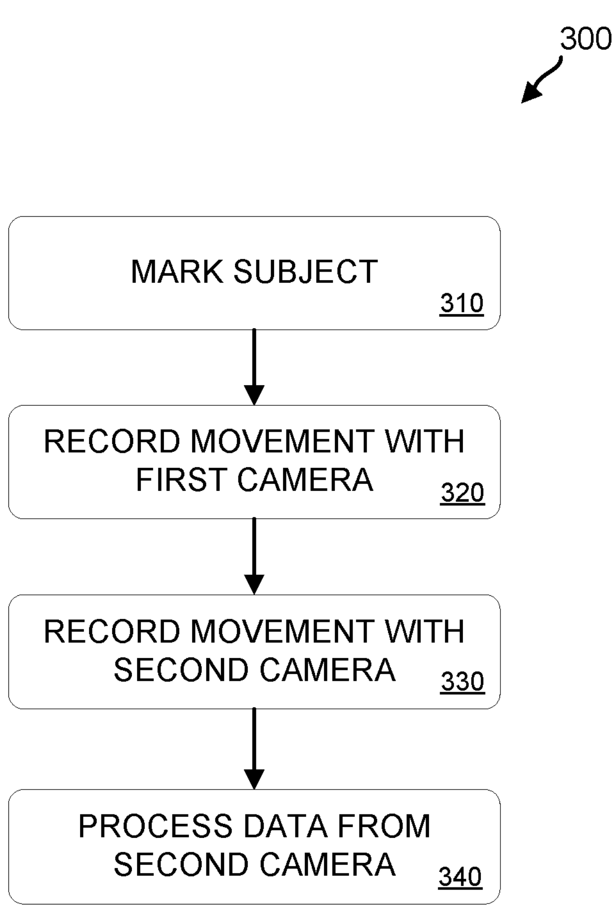
FIG. 3 is a schematic flowchart illustration of a method of collecting and generating data with the data collection system of FIG. 1 according to some embodiments.

FIG. 3 is a schematic flowchart illustration of a method 300 of collecting and generating data with the data collection system of FIG. 1 according to some embodiments. Some or all of the method 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. For example, data collection system 100 may be used to perform method 300.

At 310, the subject is marked, for example with a marker, at numerous locations of physical features corresponding with predefined key points or of qualitatively defined features corresponding with descriptions of key point locations. For example, the marker may be an IR marker, such as IR marker 150.

At 320, the marked subject is recorded with a first video camera. The first video camera may be insensitive to signals generated by the ink of the marker, such that the marks are invisible to the first video camera, and are, accordingly, not represented in the first video data generated by the first video camera. The first video camera may be a visible light video camera, such as RGB or visible camera 110, discussed above.

At 330, the marked subject is recorded with a second video camera. The second video camera may be sensitive to signals generated by the ink of the marker, such that the marks are visible to the second video camera, and are, accordingly, represented in the second video data generated by the second video camera. The second video camera may be an IR camera, such as IR camera 130, discussed above.

In some embodiments, the first video data generated at 320 and the second video data generated at 330 are generated simultaneously. In some embodiments, the first and second cameras are synchronized such that frames of video data are recorded at substantially simultaneous times. In some embodiments, the first and second cameras are coordinated, such that video frame data is generated with corresponding identification marks such that one or more individual frames of the first video data may be respectively identified as having been captured simultaneously with a corresponding one or more individual frames of the second video data.

At 340, the second video data is processed to generate mark video data. To generate the mark video data, a processor, such as processor 160, removes video data not representing marks from the second video data. Accordingly, in some embodiments the mark video data has video data representing the marks, and does not have video data representing other image data captured by the second video camera.

Figure 4:
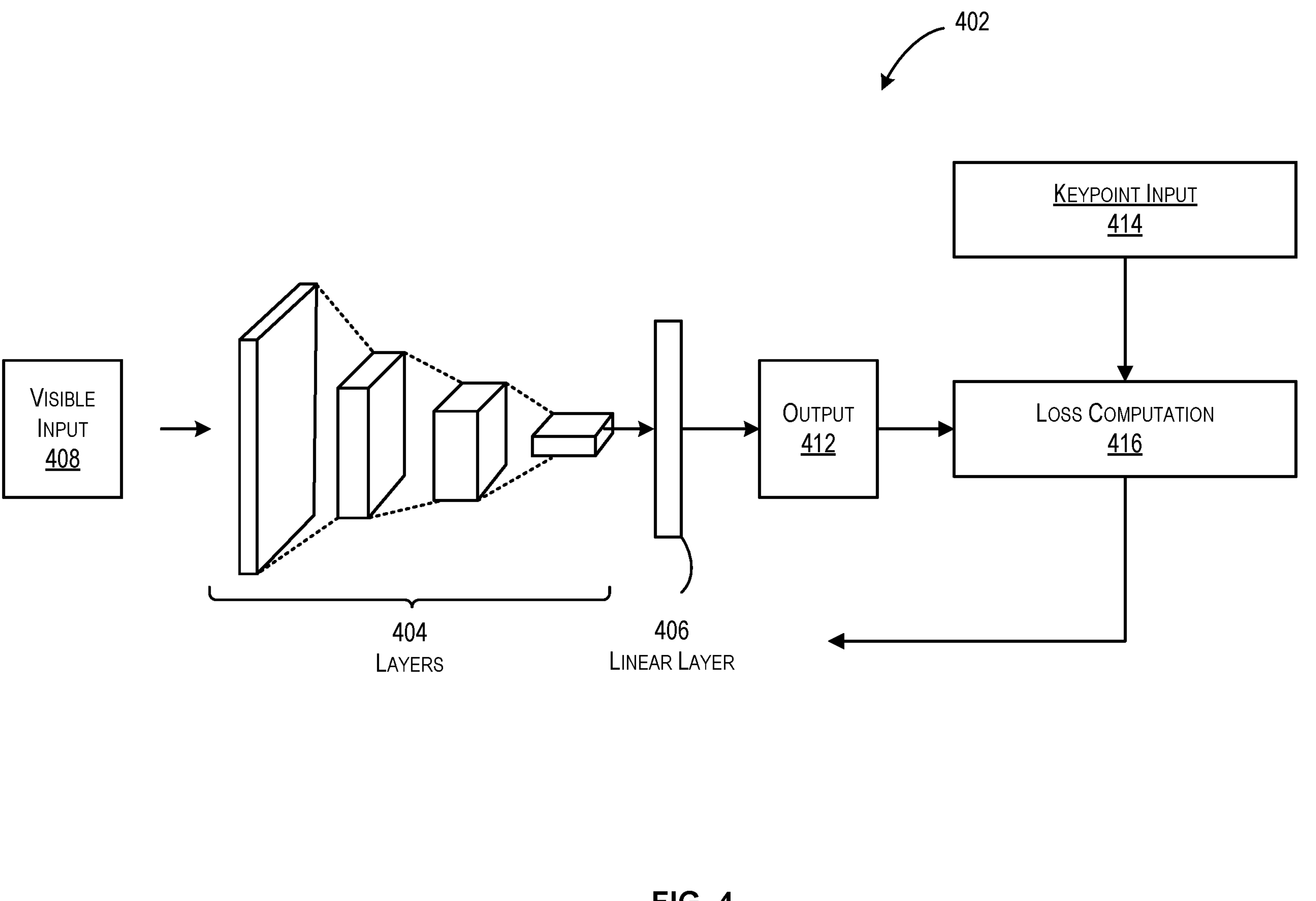
FIG. 4 is a schematic illustration of a machine learning system being trained with data collected using the data collection system of FIG. 1 according to some embodiments.

FIG. 4 is a schematic illustration of a machine learning system being trained with data collected using the data collection system of FIG. 1 according to some embodiments. FIG. 4 depicts the training of neural network 402. As depicted, the neural network 402 may include a convolutional neural network having any suitable number of layers 404. The convolutional neural network may be of a class of deep neural networks, and may be used to identify patterns in events, facts, or combinations of events and facts which elicit or provoke or cause alerts. Layers 404 may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Neural network 402 may be configured to generate output 412 from input 408 by passing input 408 incrementally through layers 404 and linear layer 406. Input 408 may be, for example, frames of video data without mark data, such as RGB or visible video data, as discussed elsewhere herein.

Neural network 402 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value).

By way of example, RGB or visible video data frames are transmitted to the neural network 402 as input 408. The input 408 may be processed through layers 404 and 406 to generate an output 412, where the output 412 represents a number of key point locations.

Although not depicted, the layers 404 and 406 of neural network 402 may include tuning weights corresponding to each portion of a fully connected layer. The tuning weights may, for example, express connection strengths between each value and a corresponding category or classification. Additionally, the layers 404 and 406 of neural network 402 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

In some embodiments, neural network 402 may be initialized with random or predefined tuning weights. When neural network 402 is being trained, the tuning weights are modified in response to losses calculated by loss calculation component 416, which calculates losses based on one or more differences between the mark locations as represented in the output 412 and the mark locations as represented in the mark video data supplied to neural network 402 as key point input 414. Using techniques understood by those of ordinary skill in the art, the losses are backpropagated from calculation component 416 to layers 404 and 406, and the tuning weights of layers 404 and 406 are adjusted based on the backpropagated losses. Through successive iterations of the process of inputting RGB or visible video data frames to neural network 402, comparing the output 412 generated based on each frame input in the corresponding key point input frame, and modifying the tuning weights based on the comparison results, the neural network 402 may be trained to generate accurate key point locations based on video frame input. The training iterations may be repeated any suitable number of times until error between the output produced by the neural network 402 is within a threshold of accuracy to known values. By way of example only, the neural network 402 may be trained and tuning weights adjusted until output produced by the neural network 402 is within a threshold accuracy error or a threshold accuracy percentage.

Once trained, neural network 402 may be used to generate key point data from input video frame data.

Figure 5:
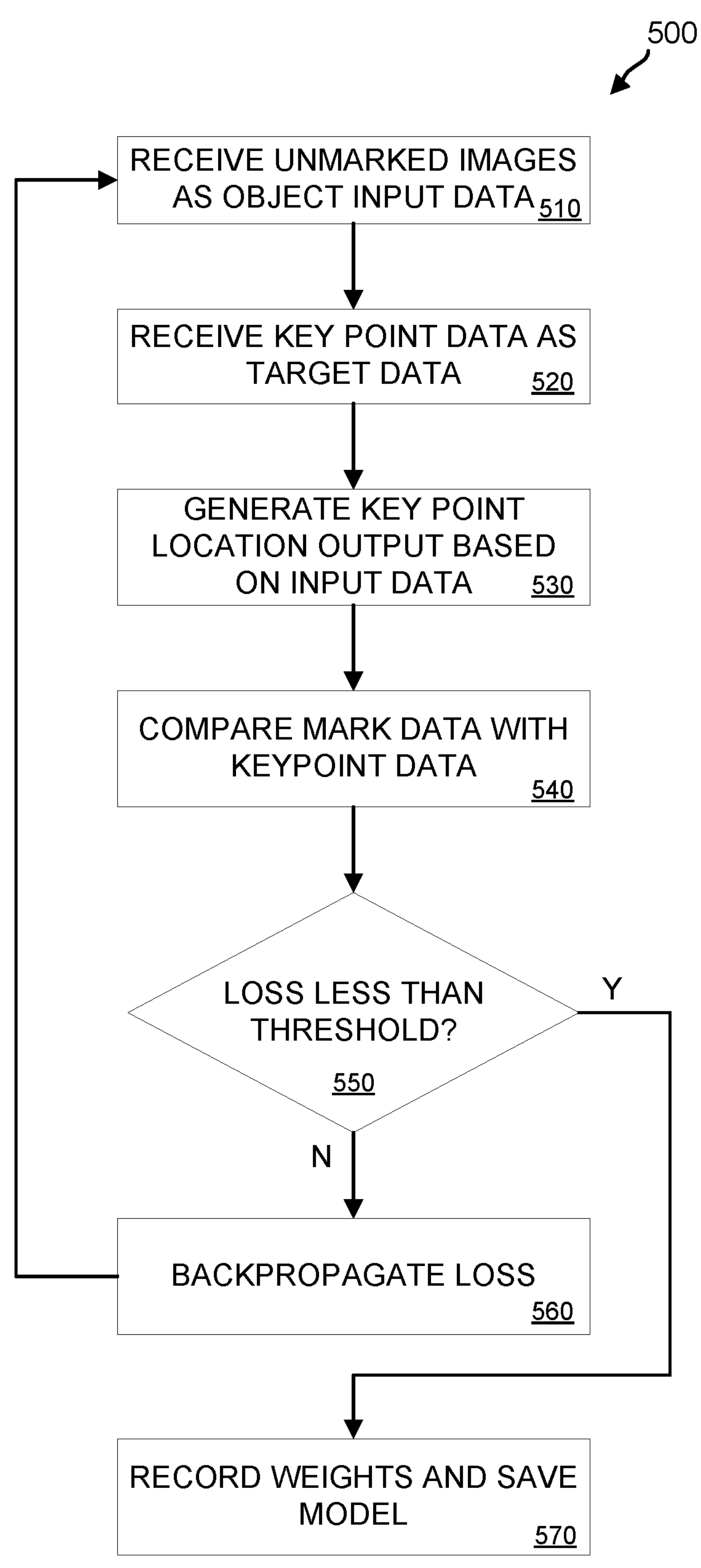
FIG. 5 is a schematic flowchart illustration of a method of training a machine learning system according to some embodiments.

FIG. 5 is a schematic flowchart illustration of a method 500 of training a mission learning system according to some embodiments. A neural network, such as neural network 402 may be used to perform method 500.

At 510, subject image data, such as frame data images, are received by the neural network as image input. The subject image data includes information indicating physical features of the subject, where some of the physical features are key point features. However, in some embodiments, the subject image data does not include information indicating key point marks identifying the physical features as key point features. In addition, the subject image data may include a series of subject images. For example, RGB or visible video data frames generated by data collection system 100 may be received by the neural network as image input.

At 520, key point image data, such as key point location data generated with a data collection system, are received by the neural network as key point target data. The key point image data includes information identifying locations of key point marks. In addition, the key point image data includes a series of key point images, where each key point image identifies locations of a number of key point marks corresponding with locations of key point features of the subject, and where each key point image corresponds with a particular subject image of the subject image data. For example, the data collected for a particular subject image and the data collected for a corresponding particular key point image may have been collected or captured simultaneously or substantially simultaneously by the data collection system. Accordingly, the key point locations indicated in the particular key point image data correspond with the key point feature locations of the subject of the particular subject data. For example, IR mark frame data generated with data collection system 100 may be received by the neural network as key point data.

In some embodiments, the neural network includes tuning weights corresponding to each portion of a fully connected layer. The tuning weights express connection strengths between each value and a corresponding category or classification. Additionally, the neural network may be configured with hyperparameters which may be predefined and user configurable. The hyperparameters may identify how many features are to be utilized for each convolutional layer, what window size or stride is used for each pooling layer, a number of hidden neurons to be used for each fully connected layer, or the like. In some embodiments, the neural network may be initialized with random or predefined tuning weights.

At 530, the subject image data may be processed by the neural network, for example, through various tuned layers weighted to generate a key point location output representing locations of a number of key points. In some embodiments, the key point location output is generated based on the subject image data, and the key point locations of the key point location output correspond with locations of physical features of the subject of the subject image data identified as being key point features by the neural network.

At 540, the key point location output data generated based on each particular subject image is compared with the corresponding key point image. If the neural network were ideal, the locations of the key points indicated by the key point location output data would be identical to the locations of the key points indicated by the corresponding key point image data.

At 550, a difference between the locations of the key points indicated by the key point location output data and the locations of the key points indicated by the corresponding key point image data is compared with a threshold, and one or more losses are calculated.

If the losses determined at 550 are greater than the threshold, at 560, the losses are backpropagated, and the tuning weights of the neural network are modified based at least in part on the backpropagated losses. In some embodiments, the tuning weights of the neural network are modified based on various characteristics of the difference.

If the difference determined at 550 is less than a threshold, at 570, the current values of the tuning weights of the neural network are stored in a memory.

The tuning weights are modified by weight generation system 416 based on one or more differences between the mark locations as represented in the output 412 and the mark locations as represented in the mark video data supplied to neural network 402 as key point input 414. Through successive iterations of the process of inputting RGB or visible video data frames to neural network 402, comparing the output 412 generated based on each frame input in the corresponding key point input frame, and modifying the tuning weights based on the comparison results, the neural network 402 may be trained to generate key points based on video frame input. The training iterations may be repeated any suitable number of times until error between the output produced by the neural network 402 is within a threshold of accuracy to known values. By way of example only, the neural network 402 may be trained and tuning weights adjusted until output produced by the neural network 402 is within a threshold accuracy error or a threshold accuracy percentage.

Figure 6:
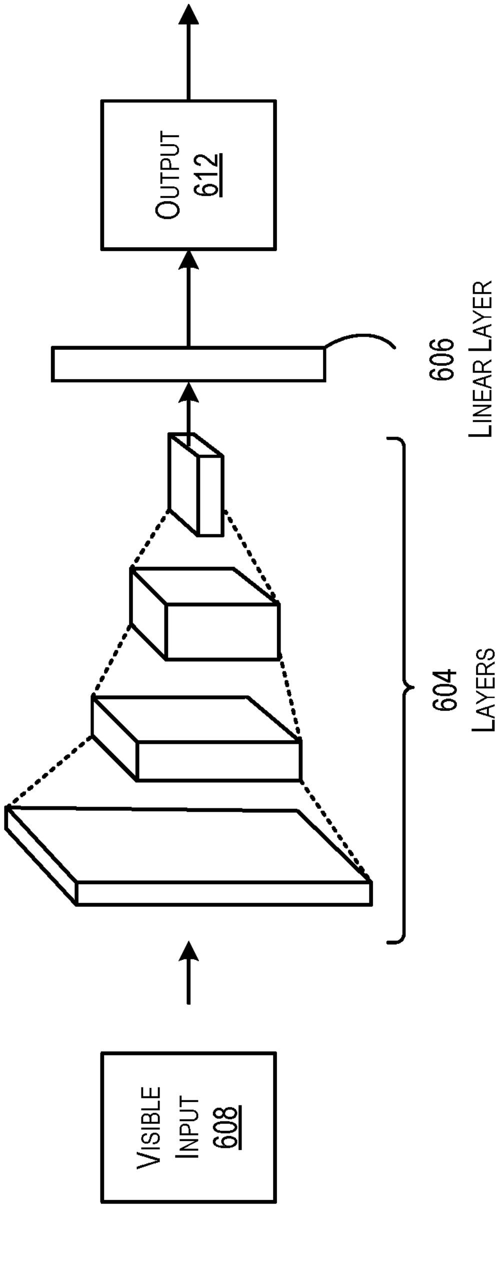
FIG. 6 is a schematic illustration of a trained machine learning system according to some embodiments.

FIG. 6 is a schematic illustration of a trained machine learning system having a neural network 602 according to some embodiments. As depicted, the neural network 602 may include a convolutional neural network having any suitable number of layers 604. The convolutional neural network may be of a class of deep neural networks, and may be used to identify patterns in events, facts, or combinations of events and facts which elicit or provoke or cause alerts. Layers 604 may include any suitable convolutional layer (e.g., configured to detect certain features of the input based on one or more filters, a layer that performs a convolution operation to input and passes the result to the next layer), rectified linear unit layers (e.g., configured to remove unwanted numbers such as negative numbers), pooling layers (e.g., layers that take a larger input and distill the input to a smaller form), and flattening layers (e.g., a layer configured to convert two-dimensional arrays from pooled features into a single, long continuous linear vector).

Neural network 602 may be configured to generate output 612 from input 608 by passing input 608 incrementally through layers 604 and linear layer 606. Input 608 may be, for example, frames of video data without mark data, such as RGB or visible video data, as discussed elsewhere herein.

Neural network 402 may be configured with any suitable number of additional layers such as flattening layers (e.g., a layer configured to convert two-dimensional arrays from pooled features into a single, long continuous linear vector), fully connected layers (e.g., layers in which every input of a vector generated by one or more previous layers is connected to a corresponding portion of an output vector), and soft-max layers (e.g., a layer configured to turn values of an output vector to values that, when summed together, add up to 1 or a predefined maximum value).

Although not depicted, the layers 604 and 606 of neural network 602 may include tuning weights corresponding, for example, to each portion of a fully connected layer. These tuning weights express connection strengths between each value and a corresponding category or classification. In this embodiment, the tuning weights are accessed from a memory, where the tuning weight values have been determined and stored using a training process, such as that described with reference to FIG. 5. Additionally, the layers 604 and 606 of neural network 602 may be configured with hyperparameters (not depicted) which may be predefined and user configurable. These hyperparameters may identify how many features are to be utilized for each convolutional layer, what window size or stride is used for each pooling layer, a number of hidden neurons to be used for each fully connected layer, or the like.

By way of example, RGB or visible video data frames are transmitted to the neural network 602 as input 608. The input 608 may be processed through layers 604 and 606 to generate an output 612, where the output 612 represents a number of key point locations.

Figure 7:
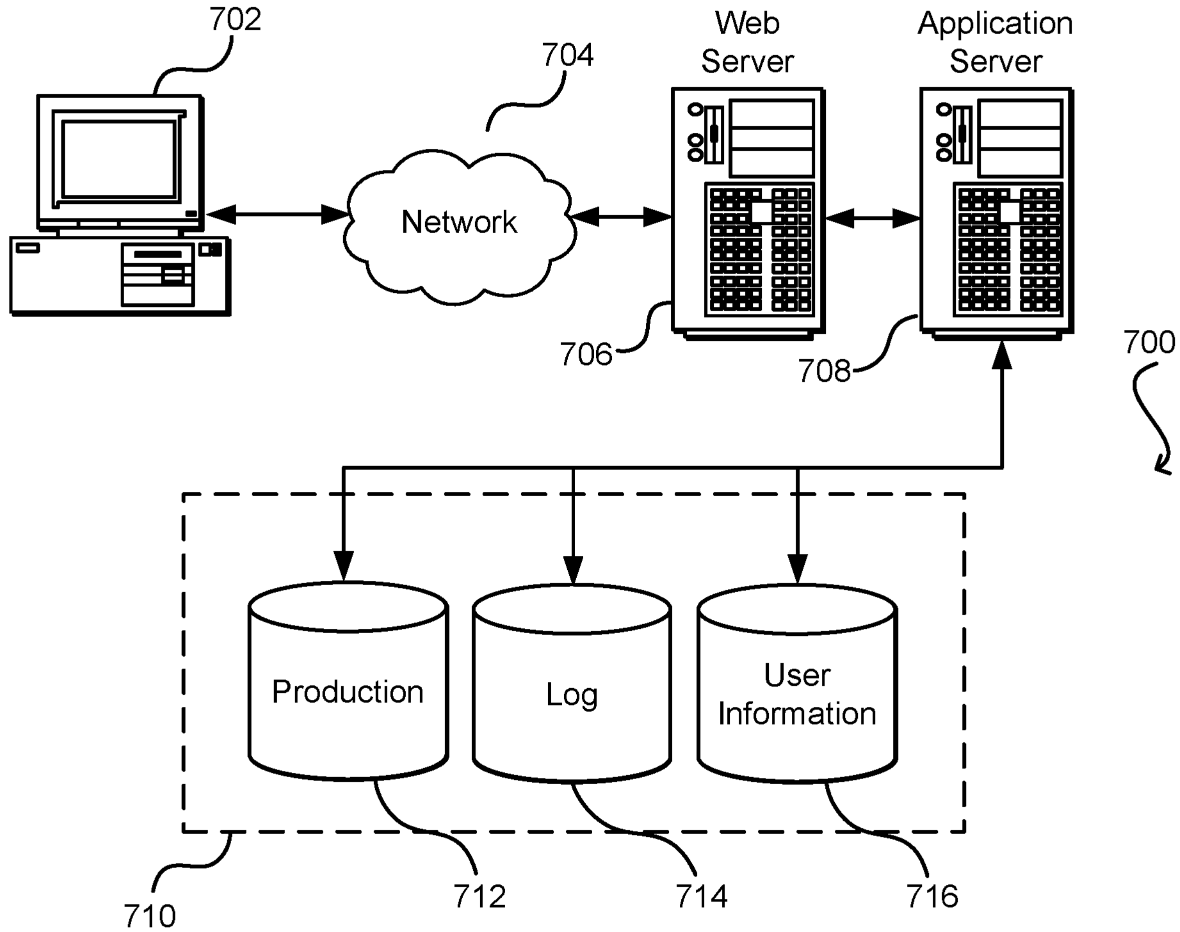
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:

training, by a computing system, a machine learning system to generate key points from a subject image, training the machine learning system comprising:

receiving, with the machine learning system, mark data, the mark data having been generated by processing marked image data of a marked subject to remove at least a portion of the marked image data representing the marked subject and to preserve at least a portion of the marked image data representing marks on the marked subject, the marked image data having been captured with a first camera, the first camera being sensitive to the marks on the marked subject;

receiving, with the machine learning system, unmarked image data of the marked subject, the unmarked image data having been captured with a second camera, the second camera being insensitive to the marks on the marked subject;

generating, with the machine learning system, key point location data based at least in part on the unmarked image data and based at least in part on a plurality of tuning weights;

comparing, with the machine learning system, the key point location data with the mark data;

modifying, with the machine learning system, the tuning weights based at least in part on the comparison; and storing, by the computing system, the modified tuning weights.

2. The method of claim 1, wherein the marked image data is captured with an infrared (IR) camera, wherein the unmarked image data is captured with a visible light camera, and wherein the marked subject is marked with an IR marker.

3. The method of claim 1, wherein the unmarked image data and the marked image data are captured at a same time.

4. The method of claim 1, wherein the marked image data are captured automatically.

5. A system, comprising:

one or more memories configured to store computer instructions; and one or more processors configured to access the one or more memories and execute the computer instructions to at least:

train a machine learning system to generate key points from a subject image, training the machine learning system comprising:

receive mark data, the mark data having been generated by processing marked image data of a marked subject to remove at least a portion of the marked image data representing the marked subject and to preserve at least a portion of the marked image data representing marks on the marked subject, the marked image data having been captured with a first camera, the first camera being sensitive to the marks on the marked subject;

receive unmarked image data of the marked subject, the unmarked image data having been captured with a second camera, the second camera being insensitive to the marks on the marked subject;

generate key point location data based at least in part on the unmarked image data and based at least in part on a plurality of tuning weights;

compare the key point location data with the mark data;

modify, the tuning weights based at least in part on the comparison; and store the modified tuning weights.

6. The system of claim 5, wherein the generated key points identify locations of physical features of a subject of the subject image.

7. The system of claim 5, wherein the mark data is generated by processing the marked image data to remove at least a portion of the marked image data representing the marked subject and to preserve at least a portion of the marked image data representing the marks.

8. The system of claim 5, wherein the mark data is automatically generated.

9. The system of claim 5, wherein the mark data is generated by processing video data captured by the first camera.

10. The system of claim 5, wherein the marked image data is captured with an infrared (IR) camera, wherein the unmarked image data is captured with a visible light camera, and wherein the marked subject is marked with an IR marker.

11. The system of claim 5, wherein the unmarked image data and the marked image data are captured at a same time.

12. The system of claim 5, wherein the marked image data is captured while illuminating the marked subject with a light source emitting light to which the first camera is sensitive.

13. One or more computer-readable media storing computer-executable instructions that, when executed by one or more processors, configure the one or more processors to perform operations comprising:

training a machine learning system to generate key points from a subject image, training the machine learning system comprising:

receiving, with the machine learning system, mark data, the mark data having been generated by processing marked image data of a marked subject to remove at least a portion of the marked image data representing the marked subject and to preserve at least a portion of the marked image data representing marks on the marked subject, the marked image data having been captured with a first camera, the first camera being sensitive to the marks on the marked subject;

receiving, with the machine learning system, unmarked image data of the marked subject, the unmarked image data having been captured with a second camera, the second camera being insensitive to the marks on the marked subject;

generating, with the machine learning system, key point location data based at least in part on the unmarked image data and based at least in part on a plurality of tuning weights;

comparing, with the machine learning system, the key point location data with the mark data;

modifying, with the machine learning system, the tuning weights based at least in part on the comparison; and storing the modified tuning weights.

14. The one or more computer-readable media of claim 13, wherein the generated key points identify locations of physical features of a subject of the subject image.

15. The one or more computer-readable media of claim 13, wherein the mark data is generated by processing marked image data of a marked subject to remove at least a portion of the marked image data representing the marked subject and to preserve at least a portion of the marked image data representing marks.

16. The one or more computer-readable media of claim 15, wherein the marked image data is captured with an infrared (IR) camera.

17. The one or more computer-readable media of claim 16, wherein the marked image data is video data captured by a video camera.

18. The one or more computer-readable media of claim 16, wherein the unmarked image data is captured with a visible light camera, and wherein the marked subject is marked with an IR marker.

19. The one or more computer-readable media of claim 15, wherein the unmarked image data and the marked image data are captured at a same time.

20. The one or more computer-readable media of claim 15, further comprising illuminating the marked subject with a light source emitting light to which the first camera is sensitive.

* * * * *